(12) United States Patent
Yona et al.

(10) Patent No.: US 11,122,067 B2
(45) Date of Patent: *Sep. 14, 2021

(54) METHODS FOR DETECTING AND MITIGATING MALICIOUS NETWORK BEHAVIOR AND DEVICES THEREOF

(71) Applicant: F5 Networks, Inc., Seattle, WA (US)

(72) Inventors: Shlomo Yona, Kfar Yona (IL); Ron Talmor, Sunnyvale, CA (US); Itsik Mantin, Seattle, WA (US); Yaniv Shemesh, Seattle, WA (US)

(73) Assignee: F5 NETWORKS, INC., Seattle, WA (US)

( * ) Notice: Subject to any disclaimer, the term of this patent is extended or adjusted under 35 U.S.C. 154(b) by 53 days.

This patent is subject to a terminal disclaimer.

(21) Appl. No.: 16/534,126

(22) Filed: Aug. 7, 2019

(65) Prior Publication Data

US 2019/0364067 A1    Nov. 28, 2019

Related U.S. Application Data

(63) Continuation of application No. 15/710,552, filed on Sep. 20, 2017, now Pat. No. 10,432,652.

(Continued)

(51) Int. Cl.
   *H04L 29/06*    (2006.01)
(52) U.S. Cl.
   CPC ...... *H04L 63/1425* (2013.01); *H04L 63/1416* (2013.01); *H04L 63/1458* (2013.01); *H04L 63/20* (2013.01)
(58) Field of Classification Search
   CPC .................................................. H04L 63/1425
   See application file for complete search history.

(56) References Cited

U.S. PATENT DOCUMENTS 6,934,848 B1    8/2005    King et al.
6,976,164 B1    12/2005    King et al.
(Continued)

FOREIGN PATENT DOCUMENTS

WO    2015173287 A1    11/2015

OTHER PUBLICATIONS

Wang et al.; Engaging Edge Networks in Preventing and Mitigating Undesirable Network Traffic; Published in: 2007 3rd IEEE Workshop on Secure Network Protocols; Date of Conference: Oct. 16-16, 2007; IEEE Xplore (Year: 2007).

(Continued)

*Primary Examiner* — Bradley W Holder
(74) *Attorney, Agent, or Firm* — Troutman Pepper Hamilton Sanders LLP (Rochester)

(57) ABSTRACT

Methods, non-transitory computer readable media, anomaly detection apparatuses, and network traffic management systems that generate, based on the application of one or more models and for a first flow associated with a received first set of network traffic, one or more likelihood scores and at least one flow score based on the likelihood scores. One or more of the one or more models are associated with one or more browsing patterns for a web application to which the first set of network traffic is directed. A determination is made when the flow score exceeds a threshold. A mitigation action is initiated, based on a stored policy, with respect to the first set of network traffic, when the determining indicates that the flow score exceeds the established threshold.

20 Claims, 7 Drawing Sheets

Related U.S. Application Data

(60) Provisional application No. 62/397,003, filed on Sep. 20, 2016.

(56) References Cited

U.S. PATENT DOCUMENTS

| | | |
|---|---|---|
| 8,510,834 B2 | 8/2013 | Chesla |
| 8,782,790 B1 | 7/2014 | Smith et al. |
| 9,407,646 B2 | 8/2016 | Cruz Mota et al. |
| 2003/0110379 A1 | 6/2003 | Ylonen et al. |
| 2005/0071687 A1 | 3/2005 | Pathakis et al. |
| 2007/0094728 A1 | 4/2007 | Julisch et al. |
| 2009/0052330 A1* | 2/2009 | Matsunaga ........... H04L 1/0019 370/242 |
| 2009/0167520 A1* | 7/2009 | Watanabe ............. H04L 41/065 340/507 |
| 2009/0265784 A1* | 10/2009 | Waizumi ............. H04L 63/1458 726/23 |
| 2009/0304026 A1 | 12/2009 | Hamada |
| 2010/0036820 A1 | 2/2010 | Stergiou et al. |
| 2010/0263035 A1 | 10/2010 | Tock et al. |
| 2013/0254848 A1 | 9/2013 | Ge |
| 2014/0304417 A1 | 10/2014 | Fleury et al. |
| 2015/0341379 A1* | 11/2015 | Lefebvre ............... H04W 12/08 726/22 |
| 2016/0241590 A1 | 8/2016 | Smith et al. |
| 2017/0078243 A1 | 3/2017 | Backman et al. |
| 2017/0208483 A1 | 7/2017 | Chmiel et al. |
| 2018/0124090 A1 | 5/2018 | Koren et al. |

OTHER PUBLICATIONS

Rossow etai.; Sandnet: network traffic analysis of malicious software; Published in: Proceeding BADGERS '11 Proceedings of the First Workshop on Building Analysis Datasets and Gathering Experience Returns for Security pp. 78-88; ACM Digital Library (Year: 2011).

Stallings; Network and internetwork security: principles and practice. ISBN 0-02-415483-0. pages 22-23. (Year: 1995).

\* cited by examiner

METHODS FOR DETECTING AND MITIGATING MALICIOUS NETWORK BEHAVIOR AND DEVICES THEREOF This application is a continuation of U.S. patent application Ser. No. 15/710,552, filed on Sep. 20, 2017, which claims the benefit of U.S. Provisional Patent Application Ser. No. 62/397,003, filed on Sep. 20, 2016, each of which is hereby incorporated by reference in its entirety.

FIELD

This technology generally relates to network security and, more particularly, to methods and devices for detecting and mitigating malicious network behavior.

BACKGROUND

Storage networks generally include servers that store data, such as web applications, web pages, or other content. Often, the servers are protected from malicious attacks by traffic management devices, which can perform other functions including load balancing and application acceleration, for example. One such set of attacks are denial of service (DOS) attacks and another type of attack is referred to as web scraping, although many other types of malicious attacks exist.

Malicious attacks can be identified based on anomalous network traffic received by the traffic management devices. Often the originator of such anomalous network traffic is a robot (also referred to as a "bot") capable of automatically generating requests for web resources.

Unfortunately, current traffic management devices are ineffective at detecting malicious network behavior and distinguishing network attacks from benign behavior, resulting in false positives. In particular, current methods of identifying bots and malicious network attacks are not robust, and false positives often occur resulting in the implementation of mitigation techniques on benign traffic.

SUMMARY

A method for detecting and mitigating malicious network behavior implemented by a network traffic management system comprising one or more anomaly detection apparatuses, client devices, or server devices, the method including generating, based on the application of one or more models and for a first flow associated with a received first set of network traffic, one or more likelihood scores and at least one flow score based on the likelihood scores. One or more of the one or more models are associated with one or more browsing patterns for a web application to which the first set of network traffic is directed. A determination is made when the flow score exceeds a threshold. A mitigation action is initiated, based on a stored policy, with respect to the first set of network traffic, when the determination indicates that the flow score exceeds the established threshold.

An anomaly detection apparatus, comprising one or more comprising memory comprising programmed instructions stored thereon and one or more processors configured to be capable of executing the stored programmed instructions to generate, based on the application of one or more models and for a first flow associated with a received first set of network traffic, one or more likelihood scores and at least one flow score based on the likelihood scores. One or more of the one or more models are associated with one or more browsing patterns for a web application to which the first set of network traffic is directed. A determination is made when the flow score exceeds a threshold. A mitigation action is initiated, based on a stored policy, with respect to the first set of network traffic, when the determination indicates that the flow score exceeds the established threshold.

A non-transitory computer readable medium having stored thereon instructions for detecting and mitigating malicious network behavior comprising executable code which when executed by one or more processors, causes the processors to generate, based on the application of one or more models and for a first flow associated with a received first set of network traffic, one or more likelihood scores and at least one flow score based on the likelihood scores. One or more of the one or more models are associated with one or more browsing patterns for a web application to which the first set of network traffic is directed. A determination is made when the flow score exceeds a threshold. A mitigation action is initiated, based on a stored policy, with respect to the first set of network traffic, when the determination indicates that the flow score exceeds the established threshold.

A network traffic management system, comprising one or more anomaly detection apparatuses, client devices, or server devices, the network traffic management system comprising memory comprising programmed instructions stored thereon and one or more processors configured to be capable of executing the stored programmed instructions to generate, based on the application of one or more models and for a first flow associated with a received first set of network traffic, one or more likelihood scores and at least one flow score based on the likelihood scores. One or more of the one or more models are associated with one or more browsing patterns for a web application to which the first set of network traffic is directed. A determination is made when the flow score exceeds a threshold. A mitigation action is initiated, based on a stored policy, with respect to the first set of network traffic, when the determination indicates that the flow score exceeds the established threshold.

This technology has a number of associated advantages including providing methods, non-transitory computer readable media, anomaly detection apparatuses, and network traffic management systems that more effectively identify anomalous or malicious network traffic thereby significantly improving security for web applications. With this technology, sub-models associated with historical browsing patterns for web applications are used to determine whether observed behavior for a particular flow is anomalous. Accordingly, this technology advantageously improves network security and reduces false positives.

DETAILED DESCRIPTION

Figure 1:
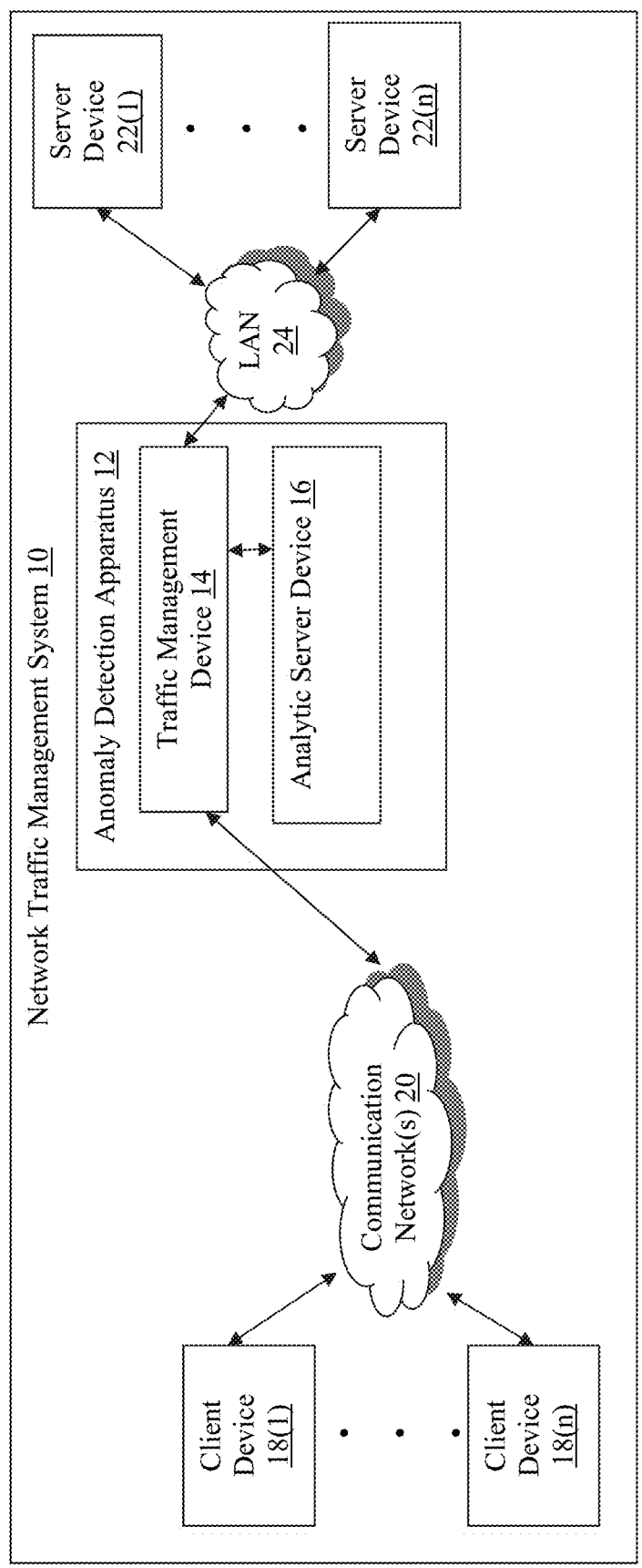
FIG. 1 is a block diagram of an exemplary network traffic management system with an anomaly detection apparatus.

Referring to FIG. 1, an exemplary network traffic management system, which incorporates an exemplary anomaly detection apparatus 12 with a traffic management device 14 and an analytic server device 16 is illustrated. In this example, the traffic management device 14 is coupled to client devices 18(1)-18(n) through communication network(s) 20, server devices 22(1)-22(n) through a local area network (LAN) 24, and the analytic server device 16 through a direct connection, although the traffic management device 14, client devices 18(1)-18(n), server devices 22(1)-2(n), and analytic server device 16 may be coupled together via other topologies. Additionally, the network traffic management system 10 may include other network devices such as one or more routers and/or switches, for example, which are well known in the art and thus will not be described herein. This technology provides a number of advantages including methods, non-transitory computer readable media, anomaly detection apparatuses, and network traffic management systems that more effectively detect and mitigate malicious network behavior, including anomalous web application usage.

Figure 2:
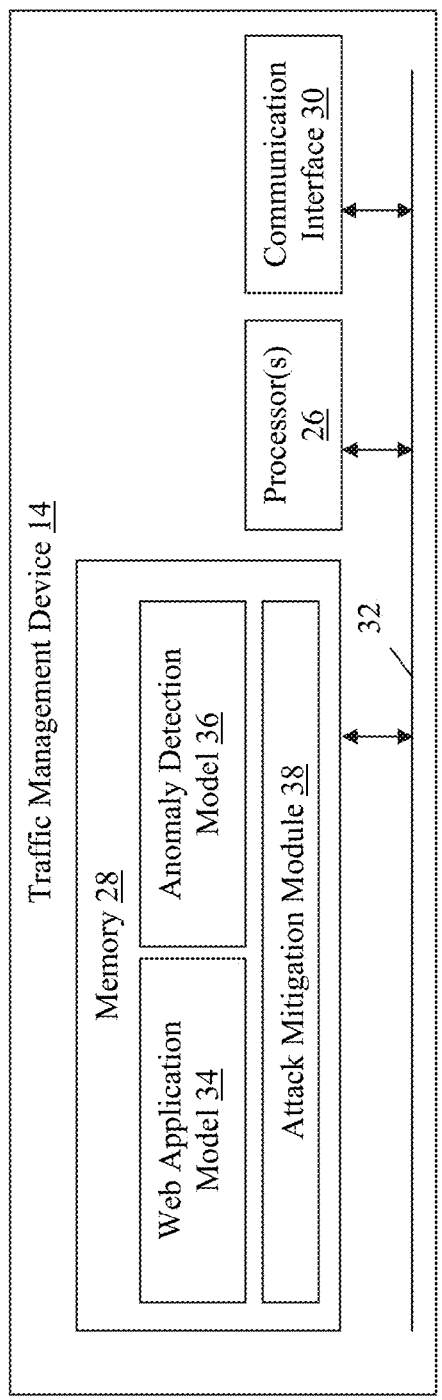
FIG. 2 is a block diagram of an exemplary traffic management device of the anomaly detection apparatus shown in FIG. 1.

Referring to FIGS. 1-2, the traffic management device 14 of the network traffic management system 10 may perform any number of functions in addition to detecting anomalous malicious network traffic including accelerating and optimizing network traffic communicated between the server devices 22(1)-22(n) and client devices 18(1)-18(n) in order to improve the user experience. The traffic management device 14 also can perform other functions on the network traffic, such as traffic management, load balancing the network traffic to the server devices 22(1)-22(n) and/or implementing firewalls or other security measures on behalf of web applications executing on the server devices 22(1)-22(n), by way of example only. The traffic management device 14 includes processor(s) 26, a memory 28, and a communication interface 30, which are coupled together by a bus 32 or other communication link, although the traffic management device 14 may include other types and/or numbers of elements in other configurations.

The processor(s) 26 of the traffic management device 14 may execute programmed instructions for any number of the functions identified above and/or described herein for detecting malicious network traffic and, optionally, managing network traffic and/or optimizing service of content requests, by way of example only. The processor(s) 26 of the traffic management device 14 may include one or more central processing units and/or general purpose processors with one or more processing cores, by way of example only, although other types of processor(s) also can be used.

The memory 28 of the traffic management device 14 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 26, can be used for the memory 28.

Accordingly, the memory 28 of the traffic management device 14 can store one or more applications that can include computer executable instructions that, when executed by the traffic management device 14, cause the traffic management device 14 to perform actions, such as to transmit, receive, or otherwise process messages, by way of example only, and to perform other actions described and illustrated below with reference to FIGS. 4-8. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the traffic management device 14 itself, may be located in virtual server(s) running in a cloud-based computing environment rather than being tied to one or more specific physical network computing devices. Also, the application(s) may be running in one or more virtual machines (VMs) executing on the traffic management device 14. Additionally, in one or more embodiments of this technology, virtual machine(s) running on the traffic management device 14 may be managed or supervised by a hypervisor.

In this particular example, the memory 28 further includes at least one web application model 34, at least one anomaly detection model 36, and an attack mitigation module 38. The traffic management device 14 obtains data regarding observed client-side network traffic directed to a web application and associated with a flow and applies the web application model 34 and anomaly detection model 36 to raw features associated with the network traffic to determine whether one of the client devices 18 (1)-18(n) associated with the flow is engaging in anomalous behavior with respect to the web application. A flow as used herein is a collection or requests and responses received from a same one of the client devices 18(1)-18(n) or user of one or more of the client devices 18(1)-18(n). In some examples, the web application model 34 and anomaly detection model 36 stored in the memory 28 of the traffic management device 14 are periodically received from and generated by the analytic server device 16, as described and illustrated in more detail later.

The web application model 34 in this example includes a plurality of sub-models associated with browsing patterns for the web application, as described and illustrated in more detail later. The traffic management device 14 can apply the web application model 34 to the flow associated with the network traffic to generate likelihood scores for each of the sub-models. The likelihood scores are indicative of whether the activity associated with one of the sub-models is likely anomalous or benign.

By way of example only, the network traffic may be a first request for a web page associated with the web application. Since the request is a first request, the web page is a start page for the flow associated with the network traffic. One of the sub-models may be a start node model that, when applied to the network traffic, can generate a likelihood score indicating how likely the web page is to be a start page for a flow (e.g., based on historical observations or other factors, as described and illustrated in more detail later). Many other examples of sub-models are described and illustrated in more detail later.

The traffic management device 14 in this example can apply the anomaly detection model 36 to each of the likelihood scores generated based on the application of the web application model 34 to the flow in order to generate a flow score indicative of whether the one of the client devices 18(1)-18(n) associated with the flow is engaging in anomalous network behavior, in which case a mitigation action may need to be initiated for the network traffic. Accordingly, the anomaly detection model 36 can include a plurality of weights for the various likelihood scores as well as other factors and other parameters that facilitate the generation of the flow score for a flow, as described and illustrated in more detail later.

The attack mitigation module 38 in this example executes a mitigation policy to initiate mitigation actions when the traffic management device 12 determines that the flow score for a flow, as generated based on the application of the anomaly detection model 36, by way of example only, exceeds a threshold indicating that the one of the client devices 18(1)-18(n) associated with the flow is likely engaging in anomalous or malicious network behavior. The mitigation policy can apply any number of factors, such as the amount that the flow score has exceeded the threshold or attributes of the one of the client devices 18(1)-18(n), by way of example only, in order to determine the mitigation action, as described and illustrated in more detail later.

The communication interface 30 of the traffic management device 14 operatively couples and communicates between the traffic management device 14, client devices 18(1)-18(n), server devices 22(1)-22(n), and analytic server device 16, which are all coupled together by the LAN 24, communication network(s) 20 and direct connection(s), although other types and/or numbers of communication networks or systems with other types and/or numbers of connections and configurations to other devices and elements. By way of example only, the LAN 24 and/or communication network(s) 20 can use TCP/IP over Ethernet and industry-standard protocols, including NFS, CIFS, SOAP, XML, LDAP, and SNMP, although other types and/or numbers of communication networks, can be used.

The communication network(s) 20 and/or LAN 24 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 20 and/or LAN 24 can also include direct connection(s) (e.g., for when a device illustrated in FIG. 1, such as the traffic management device 14, analytic server device 16, and/or server devices 22(1)-22(n) operate as virtual instances on the same physical machine).

Figure 3:
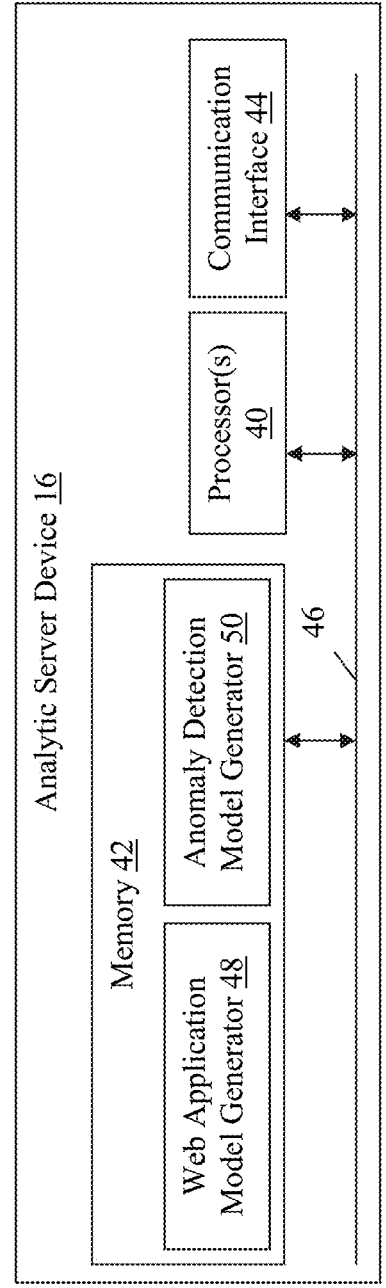
FIG. 3 is a block diagram of an exemplary analytic server device of the anomaly detection apparatus shown in FIG. 1.

Referring to FIGS. 1-3, the analytic server device 16 is configured to monitor network traffic, sanitize network traffic (e.g., to ensure only non-bot traffic is used to generate and update web application and anomaly detection models), associate network traffic with flows, and process the network traffic to generate web application and anomaly detection models. While the analytic server device 16 is illustrated in this particular example as a separate device that allows significant processing related to model generation and machine learning to be performed separate from the traffic management device 14, in other examples, the functionality provided by the analytic server device 16 can be performed by analytic modules included in the memory 28 of the traffic management device 14.

In yet other examples, the analytic server device 16 can be located in a local network or outside of a local network and accessible via a cloud architecture, by way of example only. Other configurations of the traffic management device 14 and analytic server device 16, including model generators thereof, also can be used. In this particular example, the analytic server device 16 includes processor(s) 40, a memory 42, and a communication interface 44, which are coupled together by a bus 46 or other communication link, although the analytic server device 16 may include other types and/or numbers of elements in other configurations.

The processor(s) 40 of the analytic server device 16 may execute programmed instructions for any number of the functions identified above and/or described herein for generating web application and anomaly detection models that facilitate the identification of anomalous or malicious network behavior by the traffic management device 14. The processor(s) 40 of the analytic server device 16 may include one or more central processing units and/or general purpose processors with one or more processing cores, by way of example only.

The memory 42 of the analytic server device 16 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 40, can be used for the memory 42.

Accordingly, the memory 42 of the analytic server device 16 can store one or more applications that can include computer executable instructions that, when executed by the analytic server device 16, cause the analytic server device 16 to perform actions, such as to transmit, receive, or otherwise process messages, by way of example only, and to perform other actions described and illustrated below with reference to FIGS. 4-8. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the analytic server device 16 itself, may be located in virtual server(s) running in a cloud-based computing environment rather than being tied to one or more specific physical network computing devices. Also, the application(s) may be running in one or more virtual machines (VMs) executing on the analytic server device 16. Additionally, in one or more embodiments of this technology, virtual machine(s) running on the analytic server device 16 may be managed or supervised by a hypervisor.

In this particular example, the memory 42 of the analytic server device 16 further includes a web application model generator 48 and an anomaly detection model generator 50. The web application model generator 48 is configured to generate the web application model 34, including submodels, for a particular web application. The web application model 34 for a web application may be based on time of day, day of the month, or client device platform (e.g., mobile or desktop), by way of example only. As briefly explained earlier, and described and illustrated in more detail herein, the web application model 34 encapsulates obtained knowledge regarding browsing patterns and activities associated with a web application. According, the web application model 34 includes sub-models associated with specific types of activities that are configured to, when applied to a flow, generate a likelihood score indicative of whether the activities are likely anomalous.

The anomaly detection model generator 50 in this example is configured to generate the anomaly detection model 36 that, when applied, is configured to analyze the likelihood scores, output based on an application of a web application model 34, to generate a flow score for a flow indicative of whether the flow is likely malicious. The flow score can then be used to determine whether a mitigation action should be initiated for the flow in order to protect the web application and associated one or more of the server device(s) 22(1)-22(n) hosting the web application, as described and illustrated in more detail earlier. Accordingly, in this example, the analytic server device 16 constantly monitors network traffic and periodically refines and updates the web application model 34 and anomaly detection model 36 that are sent to the traffic management device 14 to be applied to received network traffic.

The communication interface 44 of the analytic server device 16 operatively couples and communicates with the traffic management device 14, which is coupled to the analytic server devices 16 by a direct connection or LAN (not shown), although other types and/or numbers of communication networks or systems with other types and/or numbers of connections and configurations to other devices and elements also can be used.

Each of the server devices 22(1)-22(n) of the network traffic management system 10 in this example includes one or more processors, a memory, and a communication interface, which are coupled together by a bus or other communication link, although other numbers and types of network devices could be used. The server devices 22(1)-22(n) in this example process requests received from the client devices 18(1)-18(n) via the communication network(s) 20 according to the HTTP-based application RFC protocol, by way of example only. Various applications may be operating on the server devices 22(1)-22(n) and transmitting data (e.g., files or Web pages) to the client devices 18(1)-18(n) via the traffic management device 14 in response to requests from the client devices 18(1)-18(n). The server devices 22(1)-22(n) may be hardware or software or may represent a system with multiple servers in a pool, which may include internal or external networks.

Although the server devices 22(1)-22(n) are illustrated as single devices, one or more actions of each of the server devices 22(1)-22(n) may be distributed across one or more distinct network computing devices that together comprise one or more of the server devices 22(1)-22(n). Moreover, the server devices 22(1)-22(n) are not limited to a particular configuration. Thus, the server devices 22(1)-22(n) may contain a plurality of network computing devices that operate using a master/slave approach, whereby one of the network computing devices of the server devices 22(1)-22(n) operate to manage and/or otherwise coordinate operations of the other network computing devices. The server devices 22(1)-22(n) may operate as a plurality of network computing devices within a cluster architecture, a peer-to peer architecture, virtual machines, or within a cloud architecture, by way of example only.

Thus, the technology disclosed herein is not to be construed as being limited to a single environment and other configurations and architectures are also envisaged. By way of example only, one or more of the server devices 22(1)-22(n) can operate within the traffic management device 14 itself, rather than as a standalone device. In this example, the one or more of the server devices 22(1)-22(n) operate within the memory 28 of the traffic management device 14.

The client devices 18(1)-18(n) of the network traffic management system 10 in this example include any type of computing device that can generate, receive, and process network traffic, such as mobile computing devices, desktop computing devices, laptop computing devices, tablet computing devices, virtual machines (including cloud-based computers), or the like. Each of the client devices 18(1)-18(n) in this example includes a processor, a memory, and a communication interface, which are coupled together by a bus or other communication link, although other numbers and types of network devices could be used.

The client devices 18(1)-18(n) may run interface applications, such as standard web browsers or standalone client applications, which may provide an interface to make requests for, and receive content stored on, one or more of the server devices 22(1)-22(n) via the communication network(s) 20. Such applications can include emulated or headless browsers (e.g., PhantomJS) that automatically generate malicious network traffic. The client devices 18(1)-18(n) may further include a display device, such as a display screen or touchscreen, and/or an input device, such as a keyboard by way of example only.

Although the exemplary network traffic management system 10 with the traffic management device 14, client devices 18(1)-18(n), server devices 22(1)-22(n), analytic server device 16, LAN 24, and communication network(s) 20 are described and illustrated herein, other types and/or numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the traffic management device 14, client devices 18(1)-18(n), server devices 22(1)-22(n), or analytic server device 16, by way of example only, may be configured to operate as virtual instances on the same physical machine. In other words, one or more of the traffic management device 12, client devices 18(1)-18(n), server devices 22(1)-22(n), or analytic server device 16 may operate on the same physical device rather than as separate devices communicating through communication network(s). Additionally, there may be more or fewer traffic management device, client devices, server devices, or analytic server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 4:
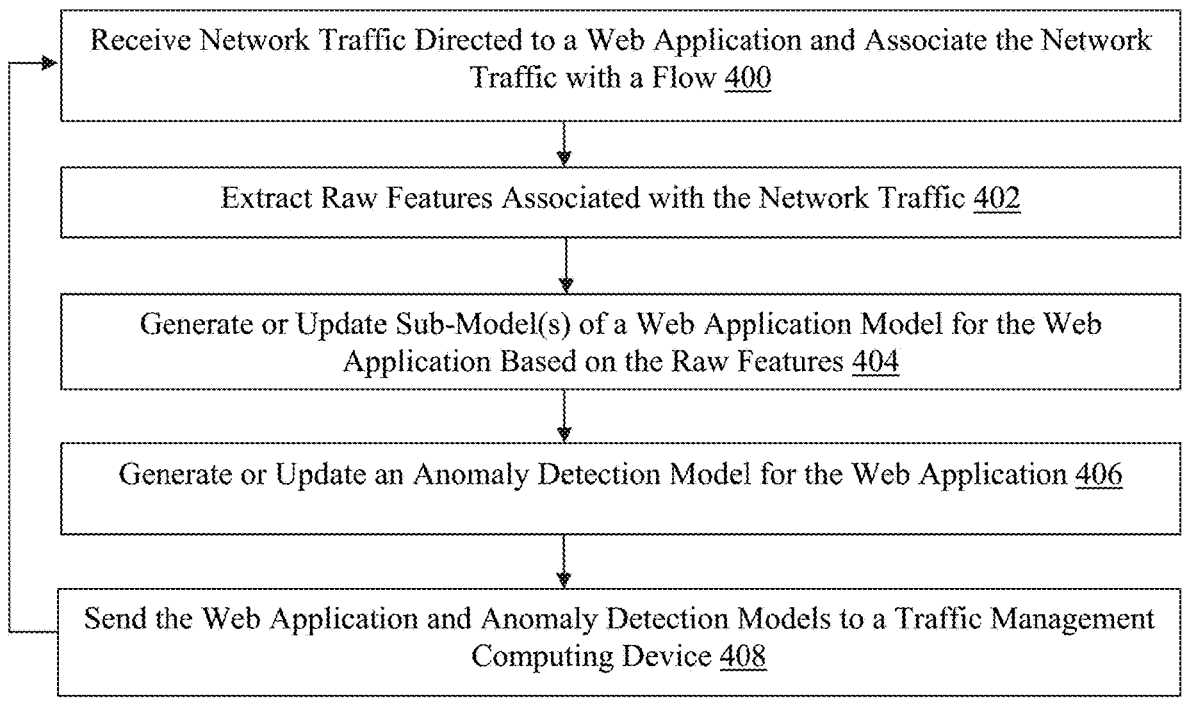
FIG. 4 is a flowchart of an exemplary method for facilitating detection of malicious network traffic with the analytic server device shown in FIGS. 1 and 3.

Exemplary methods for detecting anomalous network traffic will now be described with reference to FIGS. 1-8. Referring more specifically to FIG. 4, a method for facilitating detection of malicious network traffic with the analytic server device 16 is illustrated. In step 400 in this example, the analytic server device 16 of the anomaly detection apparatus 12 receives network traffic and associates the network traffic with a flow. The network traffic is received from one of the client devices 18(1)-18(n) and is directed to a web application hosted by one of the server devices 22(1)-22(n) in this example. The analytic server device 16 can capture all network traffic received by the anomaly detection apparatus 12 or only a portion of the traffic, with or without capture continuity (e.g., capturing a request in a session without capturing the next or previous request in the session).

In this example, the analytic server device 16 optionally sanitizes the network traffic prior to associating the network traffic with a flow. Accordingly, the analytic server device 16 can filter non-regular traffic, such as traffic likely to have originated from a bot, as well as traffic originating from a relatively unreliable source, by way of example only. By way of example only, reliability of a source can be determined based on availability of a session cookie, fingerprinting, a non-bot user agent in a header of one or more packets of the network traffic, or any other parameters or characteristics. The sanitization of the network traffic can improve the accuracy and effectiveness of the web application model 34 and anomaly detection model 36 that are generated by the analytic server device 16, as described and illustrated in more detail later.

Subsequent to the optional sanitization, the analytic server device 16 associates the network traffic with a flow and performs a flow construction. In one example, the analytic server device 16 generates and inserts cookies into network traffic associated with a flow. Accordingly, the cookies in this example include flow identifiers that are maintained throughout a session, included with associated network traffic, and used to associate network traffic with a particular flow. In another example, the HTTP referrer header can be used to perform the flow construction and to order the network traffic within a flow. Other types and/or numbers of attributes and/or other methods of flow construction and associating received network traffic with a flow also can be used.

In step 402, the analytic server device 16 extracts one or more raw features associated with the network traffic. Depending on the type of network traffic, the one or more raw features can include a URI of a web resource, a timestamp, a type of a web resource, or an indication of whether the web page is a first or last page for a flow, by way of example only, although any other features associated with the network traffic also can be extracted or determined from one or more attributes of the network traffic.

In another example, the analytic server device 16 can return client-side executable JavaScript code, for example, in response to receiving the network traffic from the one of the client devices 18(1)-18(n). The JavaScript code, when executed by the one of the client devices 18(1)-18(n), can obtain, and send to the analytic server device 16, raw features such as browsing history and behavior patterns. In particular, the JavaScript code can be configured to send URLs navigated from/to, time of navigating to a web page, time spent in a web page, performance of a web page (e.g., loading time), mouse/keyboard activity level, the number of web page revisits, the history length, or the number of sessions.

In this example, one or more portions of the obtained raw features can be persisted client-side by using HTML5 storage or other browser level storage (e.g., LocalStorage, IndexedDB, WebSQL, or FileAPI). In one example, the JavaScript code can be configured to initiate a periodic transmission of the raw features (e.g., using an AJAX call) to the analytic server device 16. Other raw features can also be obtained using client-side executable JavaScript and other methods for obtaining raw features can also be used in other examples.

In step 404, the analytic server device 16 of the anomaly detection apparatus 12 generates, for a new web application, or updates, for an existing web application, one or more sub-model(s) of the web application model 34 based on the raw features. Optionally, a number of web application models can be generated or updated for a web application. By way of example only, the web application model 34 can be maintained for a web application for a particular user platform (e.g., desktop or mobile) or for a particular time of day or day of the week, although other types and/or numbers of web application models also can be maintained for a web application.

The web application model 34 in this example is a collection of standalone sub-models that collectively encapsulate knowledge regarding browsing patterns for the web application, although the web application model 34 can be organized in other ways. Each of the sub-models encapsulates knowledge regarding a particular aspect of browsing patterns for the application and is configured to generate one or more likelihood scores that reflect whether the behavior and corresponding flow is anomalous and potentially malicious.

By way of example only, the web application model 34 can include start or end node sub-models that encapsulate knowledge regarding start and end pages, respectively, that are relatively popular for the web application, and is configured to determine the probability of entering or exiting, respectively, the application in any of the application pages. Accordingly, given information regarding a flow, including the start or end page for the flow, the start and end node sub-models are configured to generate one or more likelihood scores that reflect the likelihood that the start or end page, respectively, for a particular flow is unreasonable and associated with malicious behavior with respect to the web application.

In another example, the web application model 34 can include a page hit sub-model that is configured to determine the popularity distribution of one or more of the web pages associated with the web application. Accordingly, the page hit sub-model models the popularity distribution of the pages in a browsing flow and generates likelihood scores for each accessed page in a flow based on the popularity of the page. Optionally, the likelihood scores for each accessed page can be aggregated into an average or median, by way of example only, for the flow, which is output by the page hit sub-model.

The web application model 34 also can include a web resource hit sub-model that is configured to determine the popularity distribution of web resources associated with the web application, which can be web page and non-web page resources (e.g., images or scripts). Accordingly, the web resource hit sub-model models the popularity distribution of the web resources in a browsing flow and generates likelihood scores for accessed resource in a flow based on the popularity of the resource. Optionally, the likelihood scores for each accessed resource also can be aggregated into an average or median, by way of example only, for the flow, which is output by the web resource hit sub-model.

In yet another example, the web application model 34 can include forward or backward transition sub-models that are configured to determine the distribution of forward and backward transitions in a browsing flow, respectively, in the web application. More specifically, the forward transition sub-model is configured to determine a likelihood score based on a likelihood that a current request would be for a particular web page based on another web page that was the subject of a prior request. Additionally, the backward transition sub-model is configured to determine a likelihood score based on a likelihood that a prior request would be for a particular web page based on another web page that is the subject of a current request. Accordingly, the likelihood scores for one or more web pages associated with a current flow can optionally be aggregated and output by the forward or backward transition sub-models.

The web application model 34 also can include a visit period sub-model that is configured to model the time a user remains in a web page for the web application. Accordingly, the visit period sub-model can collect page transition times based on timestamps and determine the time difference between the next page request and the original page request to determine the visit period. Accordingly, each web page for a web application may have an associated distribution, which is used to generate a likelihood score for a current visit time for one or more of the web pages. The likelihood scores for any number of web pages in a current flow can be aggregated to generate a likelihood score for the flow that is output by the visit period sub-model.

In another example, the web application model 34 can include a resource or Asynchronous JavaScript and eXtensible Markup Language (XML) (AJAX) inclusion sub-models. The resource and AJAX inclusion sub-models are configured to model the distribution of resource or AJAX inclusion subsets for each page in a browsing flow for the web application. Accordingly, for each web page associated with the web application, the resource or AJAX inclusion sub-model can determine the likelihood that a set of resources or AJAX scripts associated with the web page would be requested subsequent to the web page. The likelihood scores for any number of web pages in a current flow are optionally aggregated to generate a likelihood score for the flow that is output by the resource or AJAX inclusion sub-models.

In yet another example, the web application model 34 can include a sections sub-model that is configured to model sequences of web pages (e.g., three to five web pages) that are the most popular in the web application. Accordingly, the sections sub-model can analyze sets of requests and associated web pages in a flow for a web application to determine and output a likelihood scores reflecting the likelihood that the set of web pages would be requested. Other numbers and types of sub-models associated with browsing patterns for the web application also can be used in other examples.

In step 406, the analytic server device 16 generates, for a new web application, or updates, for an existing web application, an anomaly detection model 36 for the web application. The anomaly detection model 36 is configured to aggregate the likelihood scores generated by an application of one or more sub-models of the web application model 34 to a current flow in order to generate a flow score. The flow score reflects the likelihood of a flow in the web application, which is indicative of whether the flow may be malicious.

Accordingly, the anomaly detection model 36 obtains likelihood scores generated by sub-models of the web application model 34 for a flow and determines a flow score for the flow that can be compared to a threshold, as described and illustrated in more detail later. Optionally, the likelihood scores are aggregated by the anomaly detection model 36 using weights, which can be dynamic across web applications and different times for particular web applications, and can depend on flow length.

Optionally, the analytic server device 16 can maintain a database, organized based on flow identifiers, that includes information, including extracted raw features, for each of a plurality of prior and/or current flows. The database can be used by the web application model generated 48 or anomaly detection model generator 50 to determine probability distributions and generate or update the web application model 34 or anomaly detection model 36.

In step 408, the analytic server device 16 in this particular example sends the web application model 34 and anomaly detection model 36, or one or more updates thereto, to the traffic management device 14. Optionally, the analytic server device 16 utilizes a training set of network traffic to generate and update the web application model 34 or anomaly detection model 36 in steps 404 and 406 prior to sending the web application model 34 or anomaly detection model 36 to the traffic management device 14. Accordingly, steps 400-406 can be repeated until a sufficient training period has elapsed such that the web application model 34 or anomaly detection model 36 can be applied with sufficient confidence and accuracy.

In response to receiving the web application model 34 and anomaly detection model 36, the traffic management device 14 applies the web application model 34 or anomaly detection model 36 to current network traffic in order to determine whether the network traffic is malicious, in which case a mitigation action should be initiated, as described and illustrated in more detail later. The current network traffic also can be the same network traffic concurrently analyzed by the analytic server device 16 to update one or more of the web application model 34 or anomaly detection model 36 subsequent to the training period, by way of example only.

Figure 5:
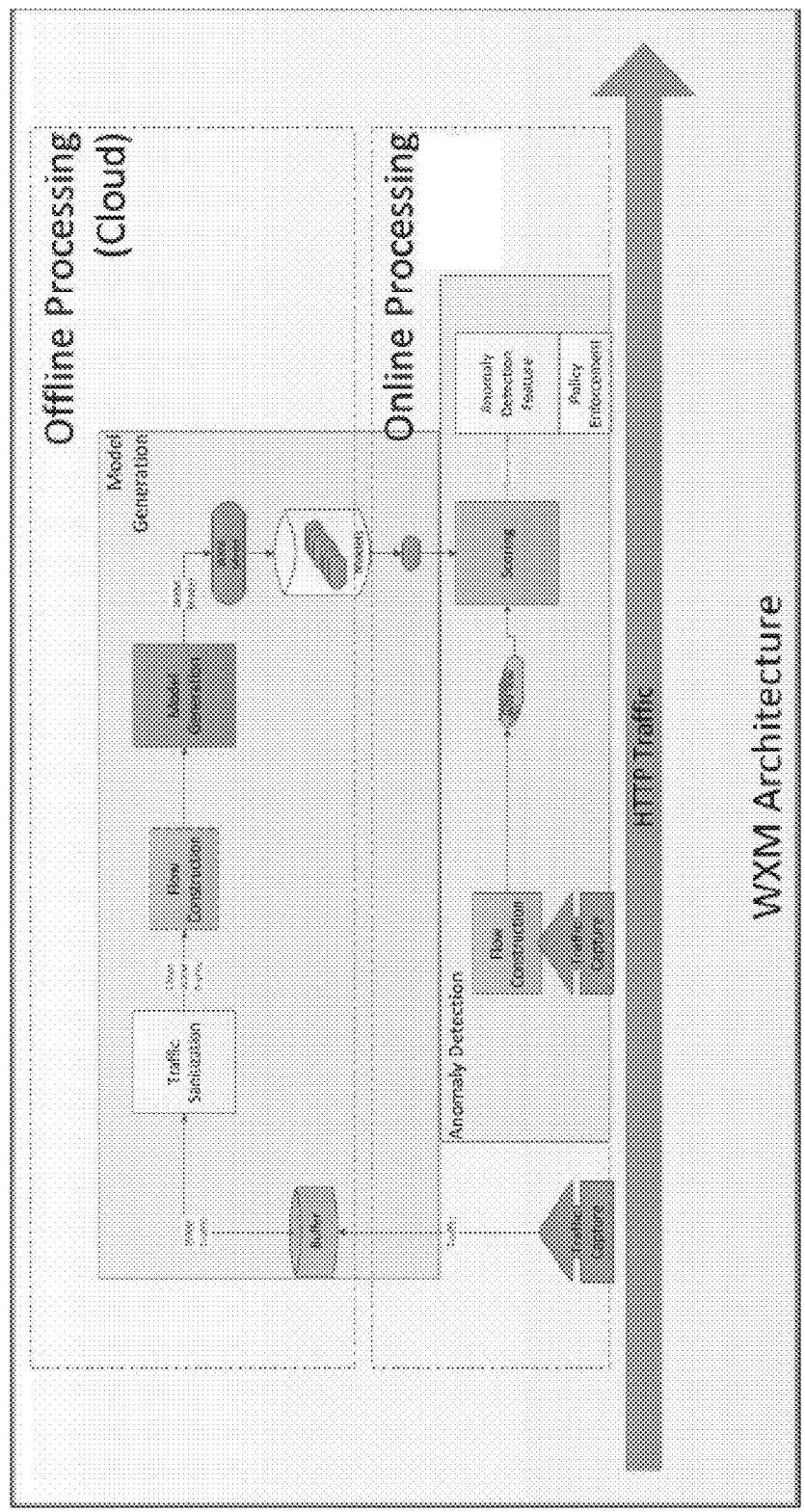
FIG. 5 is a flow diagram of exemplary offline and online processing relating to anomaly detection.

Referring more specifically to FIG. 5, a flow diagram of offline and online processing relating to anomaly detection in one exemplary implementation of this technology is illustrated. In this particular example, the offline processing or model generation flow is performed by the analytic server device 16 in a cloud architecture. Accordingly, the analytic server device 16 buffers captured network traffic, sanitizes the network traffic, associates the network traffic with a particular flow and performs a flow construction or ordering, generates the web application model 34 or anomaly detection model 36, and sends the web application model 34 or anomaly detection model 36 to the traffic management device 14 to be applied to current network traffic.

Figure 6:
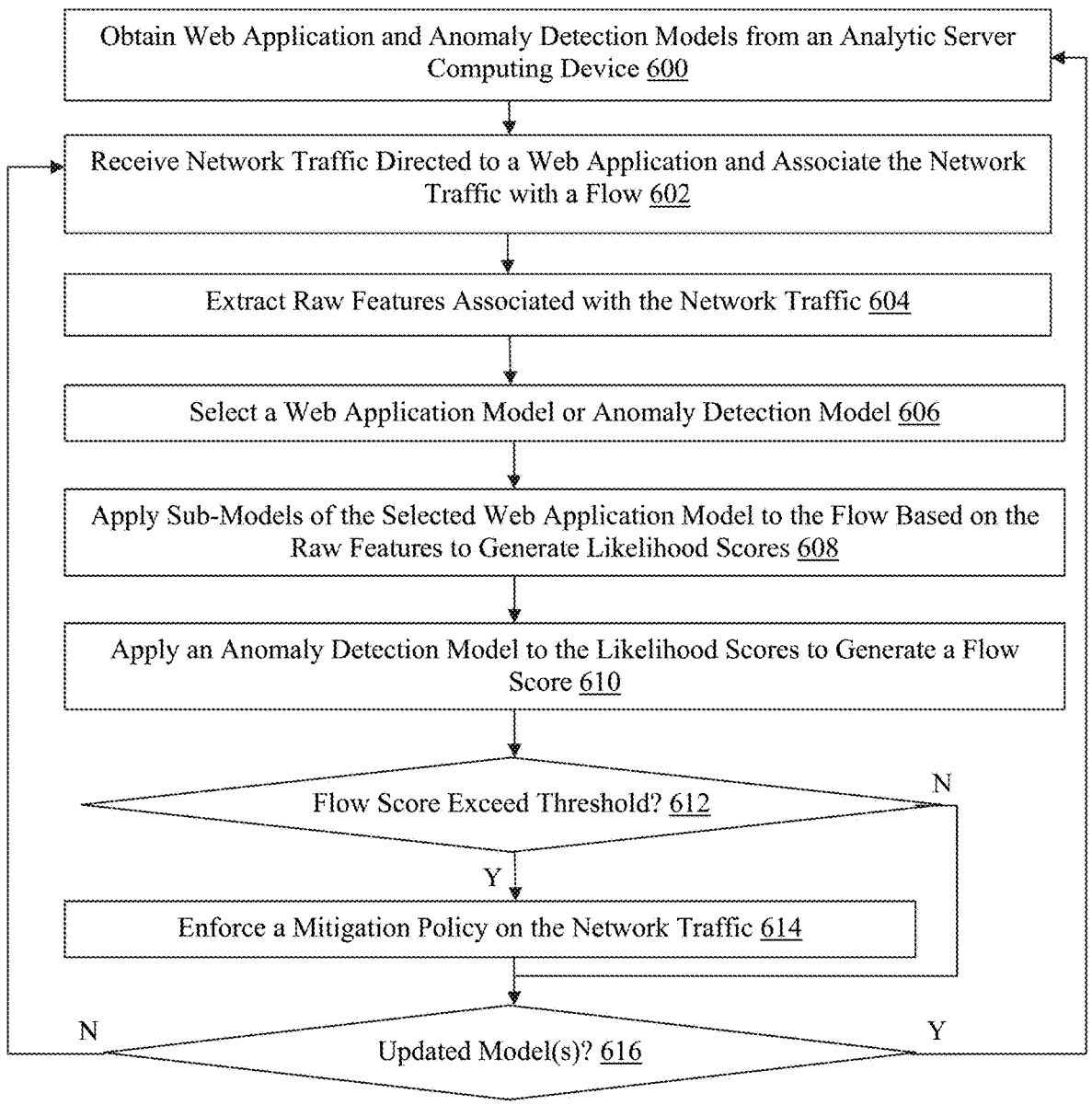
FIG. 6 is a flowchart of an exemplary method for detecting malicious network traffic with the traffic management device shown in FIGS. 1 and 2.

Referring more specifically to FIG. 6, a method for detecting malicious network traffic with the traffic management device 14 is illustrated. In step 600 in this example, the traffic management device 14 of the anomaly detection apparatus 12 obtains the web application model 34 and anomaly detection model 36 from the analytic server device 16. The web application model 34 and anomaly detection model 36 can relate to a web application hosted by one of the server devices 22(1)-22(n) and protected by the traffic management device 14, by way of example only.

The web application model 34 and anomaly detection model 36 can be sent to the traffic management device 14 by the analytic server device 16 as described and illustrated earlier with reference to step 408 of FIG. 4. Additionally more than one web application or anomaly detection model can be obtained in step 600. By way of example only, web application model 34 and anomaly detection model 36 can be specific to particular platforms or time period, although other types and/or numbers of models also can be obtained and used as described and illustrated in more detail later.

In step 602, the traffic management device 14 receives network traffic directed to the web application and associates the network traffic with a flow. The network traffic can be received from one of the client devices 18(1)-18(n) and can be associated with a flow as described and illustrated earlier with reference to step 400 of FIG. 4. In one example, the traffic management device 14 can use a session cookie to associate the network traffic with a flow, although other attributes of the network traffic also can be used. Additionally, the traffic management device 14 constructs or orders the network traffic within the flow, such as based on a referrer header in packets corresponding to the network traffic, by way of example only, although the flow also can be constructed in other ways.

In step 604, the traffic management device 14 extracts raw features associated with the network traffic, such as described and illustrated earlier with reference to step 402 of FIG. 4, by way of example only. Optionally, the traffic management device 14 can maintain a database organized by flow identifiers (e.g., maintained in session cookies) that includes raw features extracted from network traffic associated with the flow. By way of example only, a URI of a start web page can be stored in an entry of the database as associated with the flow to be used when the web application model 34 is applied, as described and illustrated in more detail later. Other types and/or numbers of information also can be maintained in the database for one or more of the observed flows.

In step 606, the traffic management device 14 selects the web application model 34 and the anomaly detection model 36. In examples in which multiple web application model or anomaly detection models are obtained in step 600, the traffic management device 14 can select one of each type of the models based on one or more characteristics of the flow. By way of example only, if a user agent header in network traffic associated with the flow indicates a mobile web browser, then a web application model for mobile platforms may be selected in step 606. In another example, a web application or anomaly detection model may be selected based on a current time of day or day of the week, by way of example only, and other types of models can be maintained and selected in step 606.

In step 608, the traffic management device 14 of the anomaly detection apparatus applies one or more sub-models of the selected web application model 34 to the flow based on the extracted or stored raw features to generate one or more likelihood scores. Generally, a plurality of sub-models will be applied, although not all sub-models of web application model 34 may be applicable at a particular point in time (e.g., an end node sub-model may not be applicable if the flow did not exit the web application) or due to a lack of sufficient raw features for the sub-model to generate sufficiently accurate likelihood score(s).

In step 610, the traffic management device 14 applies the selected anomaly detection model 36 to the likelihood scores generated in step 608 in order to generate a flow score for the flow. Accordingly, the traffic management device 14 can aggregate the likelihood scores based on specified weights according to the anomaly detection model 36 in order to generate a flow score. Optionally, one or more likelihood scores can be stored and used in the application of the anomaly detection model 36. By way of example only, the likelihood score generated by a start node sub-model will not change over time since a start page for the web application is only accessed once during a flow. Accordingly, the likelihood score generated by the start node sub-model does not need to be recalculated for multiple applications of the anomaly detection model 36 throughout the lifetime of a flow.

Figure 7:
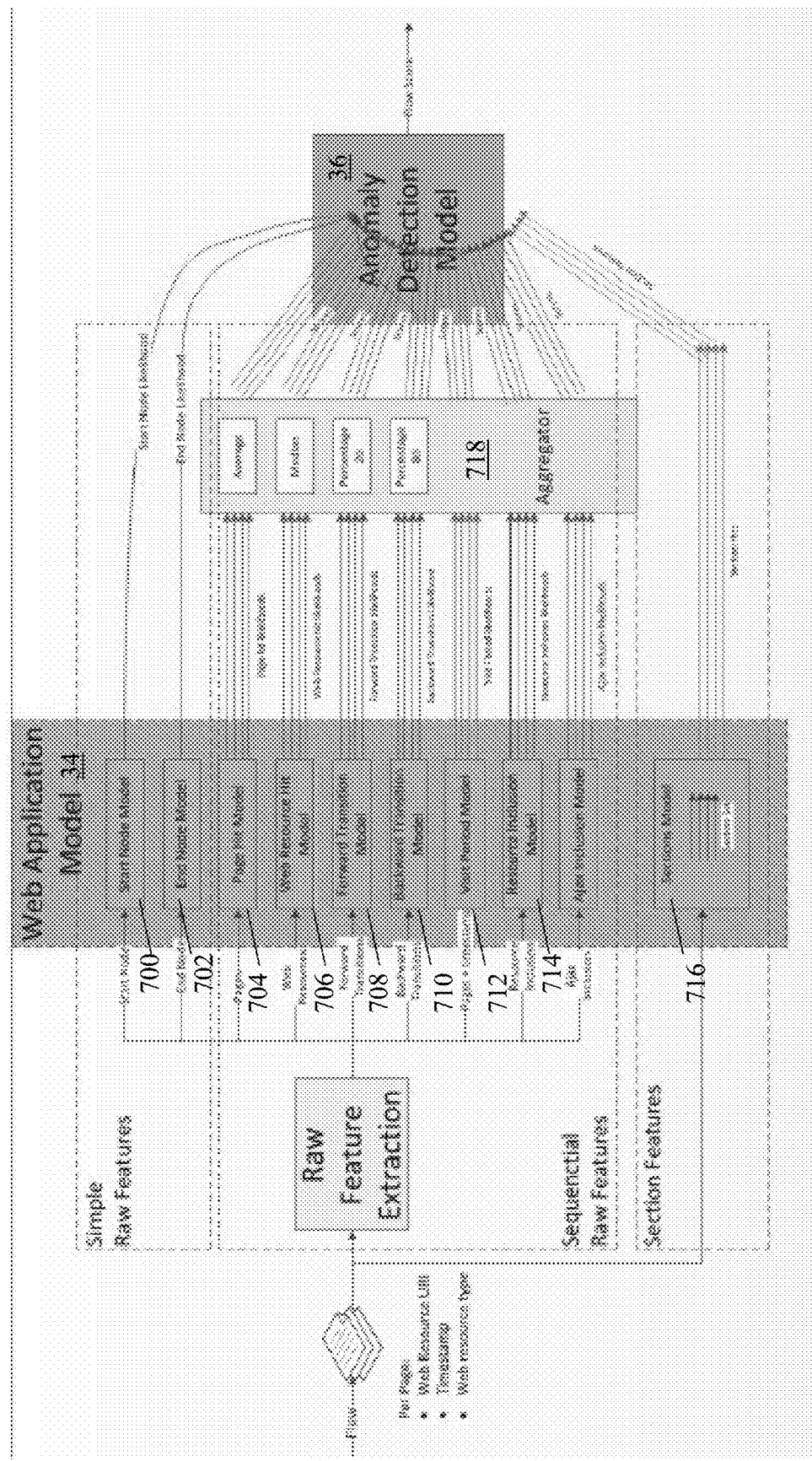
FIG. 7 is a flow diagram of a method for detecting malicious network traffic with the traffic management device shown in FIGS. 1 and 2.

Referring more specifically to FIG. 7, a flow diagram of a method for detecting malicious network traffic with the traffic management device 14 is illustrated. In this particular example, the traffic management device 14 extracts raw features for a flow based on observed network traffic directed to a web application and applies the web application model 34 with a plurality of sub-models 700-716 associated with browsing patterns for the web application. Next, the traffic management device 14 aggregates (e.g., averages), with an aggregator 718, likelihood scores output by a subset of the sub-models in order to generate one likelihood score for each of the subset of the sub-models, although other types of aggregations could be used.

The traffic management device 14 then applies the anomaly detection model 36 to the likelihood scores generated by each of the sub-models, as output by the aggregator 718 for the subset of the sub-models to generate a flow score for the flow. The application of the anomaly detection model 36 can include applying weights to one or more of the likelihood scores, by way of example only.

Referring back to FIG. 6, in step 612, the traffic management device 14 determines whether the flow score generated in step 610 exceeds an established threshold. The threshold flow score can be dynamic, learned over time, and representative of whether the flow, associated network traffic, and corresponding web application behavior is likely malicious. If the traffic management device 14 determines that the flow score exceeds the threshold, then the Yes branch is taken to step 614.

In step 614, the traffic management device 14 enforces a mitigation policy on the network traffic using the attack mitigation module 38 by way of example only. The type of mitigation initiated with respect to the network traffic for the flow can be based on the flow score, one or more characteristics of the flow, or any number of other attributes. Accordingly, mitigation actions can include dropping the network traffic and blocking subsequent network traffic associated with the flow or originating from the one of the client devices 18(1)-18(n), slowing the processing or deprioritizing the network traffic, or flagging the flow as potentially malicious resulting in heightened analysis of subsequent network traffic associated with the flow. Other types of mitigation actions also can be initiated in other examples.

Referring back to FIG. 5, the online processing or anomaly detection flow is performed by the traffic management device 14 in one example of this technology. In this particular example, the traffic management device 14 captures traffic, constructs flow(s), and performs a scoring based on a web application model 34 received from the analytic server device 16 to generate a plurality of likelihood scores for various sub-models associated with browsing patterns for the web application.

The traffic management device 14 then applies an anomaly detection model 36 to the likelihood scores to generate a flow score. The web application model 34 and anomaly detection model 36 are generated by the analytic server device 16 in an offline processing or model generation flow, as described and illustrated in more detail earlier. With the flow score, the traffic management device 14 performs policy enforcement and applies a mitigation policy to selectively initiate a mitigation action based on a comparison of the generated flow score to a threshold flow score.

Referring back to FIG. 6, subsequent to enforcing the mitigation policy on the network traffic, or if the traffic management device 14 determines in step 612 that the flow score does not exceed the threshold and the No branch is taken, then the traffic management device 14 proceeds to step 616. In step 616, the traffic management device 14 determines whether any updated web application model 34 or anomaly detection model 36 has been generated by the analytic server device 16.

Figure 8:
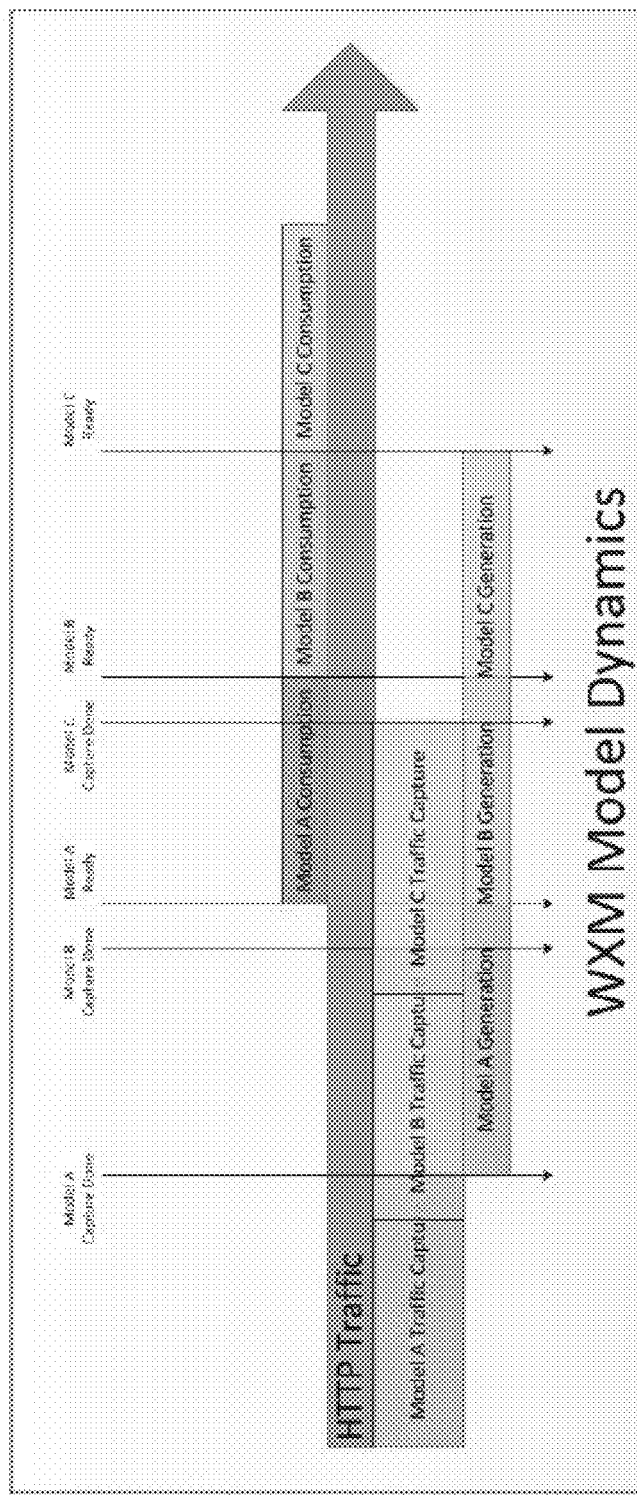
FIG. 8 is a timing diagram of network traffic capture, model generation, and model consumption.

Referring more specifically to FIG. 8, a timing diagram of network traffic capture, model generation, and model consumption is illustrated. In this particular example, network traffic to be associated with Model A is captured (e.g., observed and raw features extracted) for a period of time until capture of network traffic to be associated with Model B is initiated. While network traffic to be associated with Model B is being captured, Model A is being generated. Subsequently, Model A is consumed or sent to the traffic management device 14 and applied to received network traffic directed to the web application.

Accordingly, while Model A is being consumed, network traffic to be associated with Model C is being captured and Model B is being generated. In this example, each of the Models A, B, and C can be a web application model and the Models B and C can be updated versions of previously generated web application models (e.g., Model A and B, respectively). Therefore, the web application models in this example an be continuously updated so as to improve effectiveness based on machine learning and other techniques applied to an increased volume of observed network traffic. One or more of the Models A, B, or C could also be anomaly detection models and other types of models could also be used in other examples.

Referring back to FIG. 6, if the traffic management device 14 determines that no updated web application model 34 or anomaly detection model 36 have been generated by the analytic server device 16, then the No branch is taken back to step 602 and the traffic management device 14 continues receiving network traffic directed to the web application. Alternatively, if the traffic management device 14 determines in step 616 that one or more updated ones of the web application model 34 or anomaly detection model 36 have been generated by the analytic server device 16, then the Yes branch is taken back to step 600 and the traffic management device 14 obtains the updated web application model 34 or anomaly detection model 36 from the analytic server device 16.

Accordingly, with this technology, anomalous or malicious network traffic can more effectively be identified and security for web applications can be significantly improved. In particular, this technology uses a plurality of sub-models associated with historical browsing patterns for web applications to determine whether observed behavior for a particular flow is anomalous. Additionally, this technology provides an optimized and relatively comprehensive analysis of web application behavior and advantageously reduces false positives with respect to the identification of malicious network traffic.

Having thus described the basic concept of the disclosed technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosed technology. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for network security implemented by a network traffic management system comprising one or more anomaly detection apparatuses, server devices, or client devices, the method comprising:
   applying a model to received network traffic to generate a likelihood score and a flow score based on the likelihood score, wherein of the model is associated with a browsing pattern for a web application to which the network traffic is directed; and
   initiating a mitigation action against the network traffic, when the flow score exceeds a threshold.

2. The method of claim 1, further comprising:
   updating a sub-model of the model based on an obtained raw feature associated with other received network traffic; and
   sending a client-side script to a client that originated the other network traffic, the client-side script configured to, when executed, return the raw feature associated with the other network traffic.

3. The method of claim 2, wherein the sub-model comprises a start node model, an end node model, a page hit model, a web resource hit model, a forward transition model, a backward transition model, a visit period model, a resource inclusion model, or an Asynchronous JavaScript and eXtensible Markup Language (XML) (AJAX) inclusion model.

4. The method of claim 1, wherein the model comprises a web application model and an anomaly detection model and the method further comprises applying the web application model to the network traffic to generate the likelihood score and the anomaly detection model to the likelihood score to generate the flow score.

5. The method of claim 1, further comprising selecting the model from a plurality of stored models based on a current time or a platform corresponding to a flow associated with the network traffic.

6. A non-transitory computer readable medium having stored thereon instructions for network security comprising executable code which when executed by one or more processors, causes the processors to:
   apply a model to received network traffic to generate a likelihood score and a flow score based on the likelihood score, wherein of the model is associated with a browsing pattern for a web application to which the network traffic is directed; and
   initiating a mitigation action against the network traffic, when the flow score exceeds a threshold.

7. The non-transitory computer readable medium of claim 6, wherein the executable code when executed by the processors further causes the processors to:
- update a sub-model of the model based on an obtained raw feature associated with other received network traffic; and
- send a client-side script to a client that originated the other network traffic, the client-side script configured to, when executed, return the raw feature associated with the other network traffic.

8. The non-transitory computer readable medium of claim 7, wherein the sub-model comprises of a start node model, an end node model, a page hit model, a web resource hit model, a forward transition model, a backward transition model, a visit period model, a resource inclusion model, or an Asynchronous JavaScript and eXtensible Markup Language (XML) (AJAX) inclusion model.

9. The non-transitory computer readable medium of claim 6, wherein the model comprise a web application model and an anomaly detection model and the executable code when executed by the processors further causes the processors to apply the web application model to the network traffic to generate the likelihood score and the anomaly detection model to the likelihood score to generate the flow score.

10. The non-transitory computer readable medium of claim 6, wherein the executable code when executed by the processors further causes the processors to select the model from a plurality of stored models based on a current time or a platform corresponding to a flow associated with the network traffic.

11. An anomaly detection apparatus comprising:
- a memory comprising programmed instructions stored thereon and one or more processors configured to execute the stored programmed instructions to:
- apply a model to received network traffic to generate a likelihood score and a flow score based on the likelihood score, wherein the model is associated with a browsing pattern for a web application to which the network traffic is directed; and
- initiating a mitigation action against the network traffic, when the flow score exceeds a threshold.

12. The anomaly detection apparatus of claim 11, wherein the processors are further configured to execute the stored programmed instructions to:
- update a sub-model of the model based on an obtained raw feature associated with other received network traffic; and
- send a client-side script to a client that originated the other network traffic, the client-side script configured to, when executed, return of the raw feature associated with the other network traffic.

13. The anomaly detection apparatus of claim 12, wherein the sub-model comprises a start node model, an end node model, a page hit model, a web resource hit model, a forward transition model, a backward transition model, a visit period model, a resource inclusion model, or an Asynchronous JavaScript and eXtensible Markup Language (XML) (AJAX) inclusion model.

14. The anomaly detection apparatus of claim 11, wherein the model comprises a web application model and an anomaly detection model and the processors are further configured to execute the stored programmed instructions to apply the web application model to the network traffic to generate the likelihood score and the anomaly detection model to the likelihood score to generate the flow score.

15. The anomaly detection apparatus of claim 11, wherein the processors are further configured to execute the stored programmed instructions to select the model from a plurality of stored models based on a current time or a platform corresponding to a flow associated with the network traffic.

16. A network traffic management system comprising:
- one or more anomaly detection apparatuses, server devices, or client devices with memory comprising programmed instructions stored thereon and one or more processors configured to execute the stored programmed instructions to:
- apply a model to received network traffic to generate a likelihood score and a flow score based on the likelihood score, wherein the model is associated with a browsing pattern for a web application to which the network traffic is directed; and
- initiating a mitigation action against the network traffic, when the flow score exceeds a threshold.

17. The network traffic management system of claim 16, wherein the processors are further configured to execute the stored programmed instructions to:
- update a sub-model of the model based on an obtained raw feature associated with other received network traffic; and
- send a client-side script to a client that originated the other network traffic, the client-side script configured to, when executed, return of the raw feature associated with the other network traffic.

18. The network traffic management system of claim 17, wherein the sub-model comprises a start node model, an end node model, a page hit model, a web resource hit model, a forward transition model, a backward transition model, a visit period model, a resource inclusion model, or an Asynchronous JavaScript and eXtensible Markup Language (XML) (AJAX) inclusion model.

19. The network traffic management system of claim 16, wherein the model comprises a web application model and an anomaly detection model and the processors are further configured to execute the stored programmed instructions to apply the web application model to the network traffic to generate the likelihood score and the anomaly detection model to the likelihood score to generate the flow score.

20. The network traffic management system of claim 16, wherein the processors are further configured to execute the stored programmed instructions to select the model from a plurality of stored models based on a current time or a platform corresponding to a flow associated with the network traffic.

* * * * *